United States Patent [19]
Tagashira

[11] Patent Number: 6,154,592
[45] Date of Patent: Nov. 28, 2000

[54] OPTICAL CONNECTOR

[75] Inventor: Ryuichi Tagashira, Tokyo, Japan

[73] Assignee: Kel Corporation, Tokyo, Japan

[21] Appl. No.: 09/116,137

[22] Filed: Jul. 15, 1998

[30] Foreign Application Priority Data

Aug. 1, 1997 [JP] Japan .................................. 9-207448

[51] Int. Cl.[7] .................................................. G02B 6/36
[52] U.S. Cl. .............................................. 385/88; 385/92
[58] Field of Search .............................. 385/76–78, 139, 385/81, 84, 88, 92, 94; 361/772–774

[56] References Cited

U.S. PATENT DOCUMENTS

| | | | |
|---|---|---|---|
| 4,413,881 | 11/1983 | Kovats | 385/94 |
| 5,127,073 | 6/1992 | Mullholland et al. | 385/92 |
| 5,475,783 | 12/1995 | Kurashima | 385/92 |
| 5,631,990 | 5/1997 | Hashizume | 385/92 |
| 5,896,480 | 4/1999 | Scharf et al. | 385/88 |

*Primary Examiner*—John D. Lee
*Assistant Examiner*—Michelle R. Connelly-Cushwa
*Attorney, Agent, or Firm*—Robert W. J. Usher

[57] ABSTRACT

An optical element 30 is inserted into a cover 40, and then the cover 40 is mounted onto a housing 10. At this moment, the upper ends of lateral contacts 20a and 20c, which are provided in the housing, enter lateral clearance slots 52a, which are provided in the cover, while the upper end of a central contact 20b enters a central clearance slot 53a. At the same time, the lateral leads 33a and 33c of the optical element are pressed down by a front bottom 52 of a groove, which is provided in the cover, into the slits 22 of the contacts 20a and 20c while the central lead 33b of the optical element is pressed down by a rear bottom 53 of the groove into the slit 22 of the contact 20b. In this construction of an optical connector, the leads are not bent, so they can be made relatively short. In this way, the axial length of the optical connector can be made relatively short to realize a miniaturization.

16 Claims, 4 Drawing Sheets

OPTICAL CONNECTOR

FIELD OF THE INVENTION

The present invention relates to an optical connector that connects an optical fiber to a light-capturing element or a light-emitting element such as a photodiode or a light-emitting diode (each type of element is hereinafter referred to as an "optical element", i.e., a generic term), which is mounted on a circuit board.

BACKGROUND OF THE INVENTION

FIG. 5 shows the construction of an optical connector 100 of prior art. The optical connector 100 comprises an optical element 130 and a housing 110, in which the optical element 130 is mounted. The housing 110 includes an optical fiber receptacle 112, into which a ferrule (i.e., a member which accommodates and retains an end portion of an optical fiber 71) 70 can be fitted.

The optical element 130, which has, for example, a cylindrical form, is horizontally fitted into the housing 110. The optical element 130 includes a light-capturing or light-emitting surface (hereinafter referred to as the "light-capturing/emitting surface") 131 on the front face thereof and electrical leads (electrodes) 133 on the rear face, which leads bend downward and extend beyond the lower face of the housing 110.

This optical connector 100 is mounted on a circuit board 60, for example, by inserting the leads 133 into through-holes 61 which are provided on the circuit board 60, and then by soldering the ends of the leads which extrude to the other side of the circuit board 60, to respective electrical pathways that are provided on the circuit board. With this optical connector 100, when the ferrule 70 is fitted into the optical fiber receptacle 112, the end face of the optical fiber 71 is brought into the position where it faces the light-capturing/emitting surface 131 of the optical element 130. As a result, the connection of the optical fiber 71 to the circuit board 60 is established.

Many devices and instruments which incorporate this type of optical connector are now undergoing miniaturization, so it is necessary for the optical connector 100 to be also miniaturized.

However, the miniaturization of the optical connector 100 encounters some problems. In this type of optical connector 100, the leads 133 are bent downward so that the ends thereof extend downward beyond the housing 110. For miniaturization, in order to shorten the lengths of the leads 133 in the horizontal direction, the bending of the leads must be more acute than the present design. This means that the leads 133 must be bent in an unreasonably small curvature. This reduced bending radius of curvature may damage some members in the optical element 130, which are located next to or near the leads. In addition, even if the leads 133 were bendable in such a manner, it will be difficult to precisely position the ends of the leads 133 for the insertion into the through-holes 61 of the circuit board 60.

SUMMARY OF THE INVENTION

It is an object of the present invention to provide an optical connector which does not require any bending of the leads of an optical element.

Another object of the present invention is to provide an optical connector which has a relatively short axial length.

Another object of the present invention is to provide an optical connector which is relatively small and compact as a whole.

An optical connector according to the present invention comprises an optical element, a housing which includes a contact, and a cover. The optical element, which is formed in a cylindrical figure, includes a light-capturing/emitting surface on one face thereof and an axially extending element lead on the other face in its axial direction. The housing includes a base portion and an optical fiber receptacle. The base portion further includes an element receptor portion, which is formed opening upward and rearward on an upper side of the base portion, to accommodate and retain the optical element. The optical fiber receptacle, which is formed in front of the element receptor portion, is to accept and retain a ferrule that is attached to an end of an optical fiber. The contact, which is provided in the housing, passes vertically through the base portion in rear of the element receptor portion, and the contact includes at the upper end thereof a lead connector portion, with which the element lead of the optical element is brought into contact, and at the lower end thereof a contact lead portion, which is used for connection to a circuit board, etc. The cover includes an element holder portion to accommodate and retain the optical element, and it is mountable on the housing, covering the base portion. Preferably, the lead connector portion is formed in a "U" figure with a slit, into which the element lead is press-fit.

When the optical element, while being oriented such that the light-capturing/emitting surface faces the optical fiber receptacle and the lead extends straight rearward, is mounted into the element receptor portion, the element lead is brought into contact with the lead connector portion of the contact.

The optical connector thus assembled is then placed onto a circuit board of a device or an instrument, and the contact lead portion of the contact is soldered to a respective electrical pathway, which is provided on the circuit board. Into the optical fiber receptacle of this optical connector, the ferrule of the optical fiber is inserted to connect the optical fiber to the respective device incorporating the circuit board with the optical connector.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
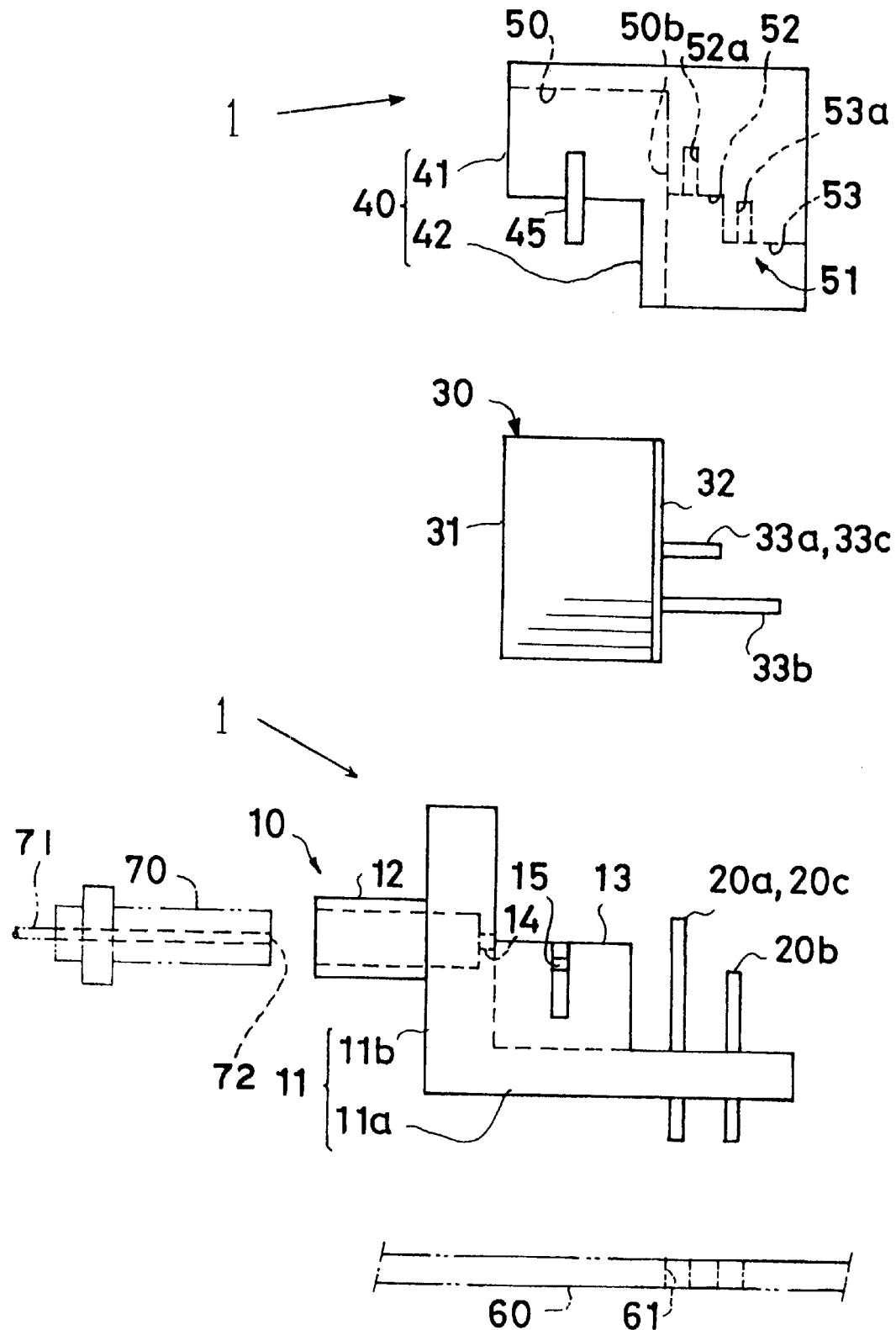
FIG. 1 is an exploded side view showing the construction of an optical connector 1 aiding to the present invention.
Figure 2:
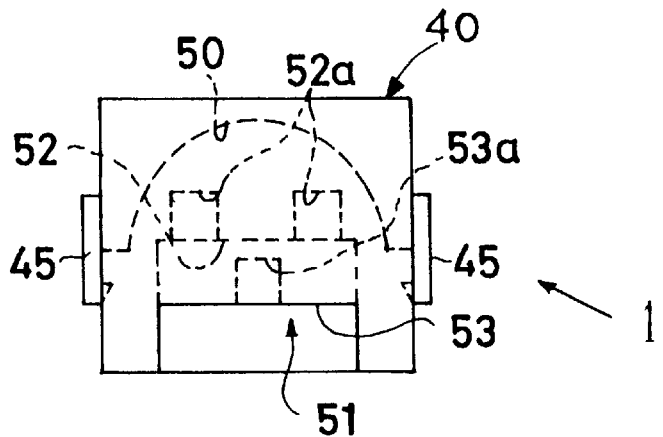
FIG. 2 is an exploded rear view of the optical connector 1 shown in FIG. 1.
Figure 2:
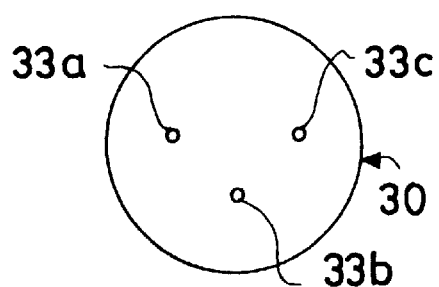
Figure 2:
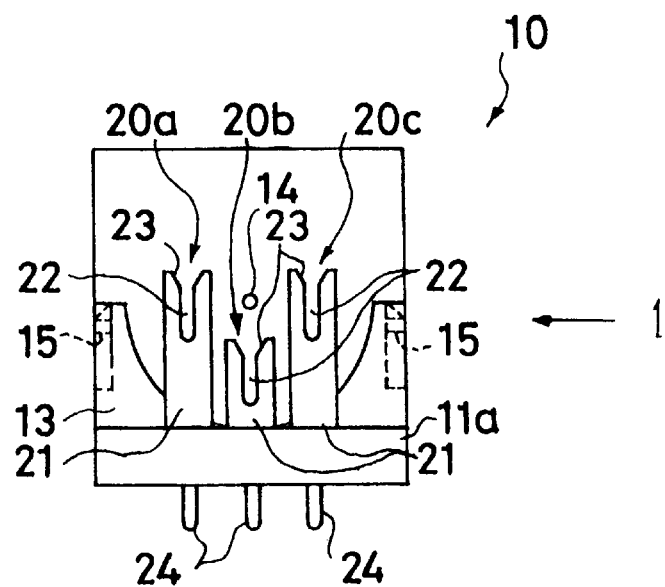
Figure 2:
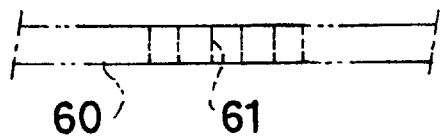

FIGS. 1 and 2 show the construction of an optical connector 1 according to the present invention. This optical connector 1 is used to connect an optical fiber to an optical element such as a light-emitting diode or a photodiode.

As shown in the figures, this optical connector 1 comprises a receptacle housing 10 (hereinafter referred to as "the housing"), which includes U contacts 20a through 20c; an optical element 30, which is mounted in the housing 10; and a cover 40, which is mounted on the housing 10, surrounding the optical optical element 30.

The housing 10 includes a base portion 11, which comprises a bottom part 11a; and a side part 11b, which extends upward from a front portion of the bottom part 11a, such that the housing 10 has a "L" figure in the side view. A tubular optical fiber receptacle 12 is provided extending forward from the side part 11b, and an aperture 14 is provided in the side part 11b coaxially with the optical fiber receptacle 12. In addition, behind the side part 11b, a receptor portion (element receptor portion) 13 is provided on the bottom part 11a to accept and retain the optical element 30.

In the housing 10, the U contacts 20a through 20c pass through the bottom part 11a in a rear region behind the receptor portion 13.

These U contacts (hereinafter referred to as "the contacts") are formed of a planar electrically conductive material. As shown in FIG. 2, each contact comprises a lead connector portion 21, which is formed in a "U" figure with a slit 22 opening upward; and a lead portion (contact lead portion) 24, which extends downward through the bottom part 11a of the housing, such that each contact as a whole looks like a tuning fork. The lead connector portion 21 of the lateral contacts 20a and 20c are identical to each other while the lead connector portion 21 of the central contact 20b is shorter than those of the lateral contacts.

The width of the slit 22 of each contact is formed a little smaller than the diameter of the respective lead (33a through 33c) of the optical element 30, and the upper ends of the lead connector portion 21 of each contact where the slit 22 opens upward is tapered providing tapered faces 23, such that the upper end of each slit 22 opens widening upward. These contacts 20a through 20c are insert molded at the respective positions through the bottom part 11a when the housing 10 is molded.

The lateral contacts 20a and 20b are in lateral alignment with each other while the central contact 20b is offset rearward with respect to the lateral contacts. The lateral pitch between the contacts 20a and 20b is identical with the lateral pitch between the contacts 20b and 20c such that the contacts are arranged in a zigzag pattern in a top view.

The optical element 30, which has a cylindrical form, is laid horizontally such that the axis of the optical element 30 is parallel to the axis of the housing. Then the optical element 30 is lowered into the receptor portion 13 of the housing. The optical element 30 includes a light-capturing/emitting surface 31 as a front face (the left end face in FIG. 1) and three leads (electrodes) 33a through 33c on a rear face (the right end face in FIG. 1) 32, the leads extending linearly rearward. As shown in FIG. 2, the lateral leads 33a and 33c are aligned horizontally while the central lead 33b is positioned lower than the lateral leads. In this orientation, the optical element 30 is mounted into the housing 10.

The length of the lateral leads 33a and 33c are shorter than the central lead 33b, and each of them has a length just enough to reach a respective position where the contact 20a, 20b or 20c is located in the housing 10.

The cover 40, which has an inverted "L" figure in the side view to match the part of the housing 10 behind the side part 11b, comprises a front portion 41, which meets the receptor portion 13 of the housing 10, and a rear portion 42, which meets the bottom part 11a behind the receptor portion 13. In the front portion 41, a holder portion 50 is provided opening downward to accommodate and retain the optical element 30 therein.

In the rear portion 42, a groove 51 is provided extending axially and opening downward. This groove 51 has an elevational difference in the axial direction, i.e., the depth of the front portion of the groove differs from that of the rear portion (the heights of the bottoms of the groove in the front and the rear are different as shown in the figures). The depth (or height) of the bottom (the upper edge shown in the figures) 52 of the groove at the front portion is determined in correspondence to the height of the lateral leads 33a and 33c from the bottom part 11a of the housing 10 in the assembled condition while the depth of the bottom 53 of the groove is determined in correspondence to the height of the central lead 33b.

In the front bottom 52 of the groove, two lateral clearance slots 52a are provided at the locations which will come directly above the lateral contacts 20a and 20c. In the rear bottom 53, a clearance slot 53a is provided at the location which will come directly above the central contact 20b.

The cover 40 also includes a pair of locking arms 45, which extend downward from the lateral faces thereof, while a pair of hooks 15 are provided in the lateral faces of the receptor portion 13 of the housing 10. When the cover 40 is mounted onto the housing 10, the protrusions of the locking arms 45 engage with the hooks 15 to fix the cover 40 on the housing 10.

In this optical connector 1, when the optical element 30 and the cover 40 are assembled onto the housing 10, the cover 40 serves as a jig to press-fit the leads 33a through 33c of the optical element into the contacts 20a through 20c of the housing. Since the cover 40 works as such a jig, it is preferable that the optical element 30 be first put into the cover 40, and then the optical element 30 together with the cover 40 be put into the housing 10.

Figure 3:
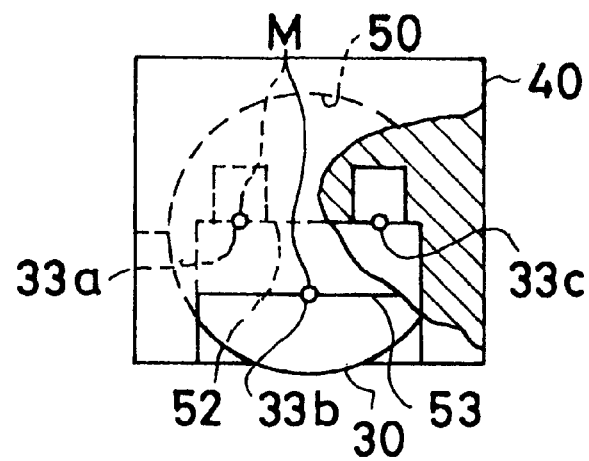
FIG. 3 is a rear view showing a cover 40 and an optical element 30, which is fitted into the cover 40.

Therefore, as shown in FIG. 3, the optical element 30 is inserted into the holder portion 50 of the cover 40 to fix the relative position of the optical element 30 in the cover 40. As a result, the lateral leads 33a and 33c are brought into contact with the front bottom 52 of the groove while the central lead 33b is brought into contact with the rear bottom 53.

In this condition, where the optical element 30 is incorporated in the cover 40, the cover 40 is oriented with respect to the housing 10, for example, by positioning the front face of the cover 40 onto the rear face of the side part 11b of the housing 10. Then, the cover 40 is lowered. As the cover comes down, the tops of the lateral contacts 20a and 20c of the housing enter the lateral clearance slots 52a and 52a, which are provided in the cover, while the top of the central contact 20b enters the central clearance slot 53a.

At this moment, the lateral leads 33a and 33c of the optical element are pressed by the front bottom 52 of the groove 51 of the cover into the slits 22 of the lateral contacts 20a and 20c of the housing while the central lead 33b is pressed by the rear bottom 53 into the central contact 20b. Although the tops of the lead connector portions 21 are forced to open when the leads 33a through 33c are pressed into the slits, they do not open because the upper lateral sides of the lead connector portions 21 are guided in the clearance slots 52a and 53a. In this way, the forces of the lead connector portions 21 to retain the leads are maintained.

As the slits 22 at the upper ends of the contacts 20a through 20c are tapered widening upward, even the leads 33a through 33c which do not extend straight rearward can be guided into the slits 22.

As shown in FIG. 3, if lead guide grooves M, which guide and retain the leads 33a through 33c, are provided in the bottoms 52 and 53 of the groove 51, then the leads 33a and 33c can be guided straight rearward. In this way, the correct positioning of the leads in the lateral direction is ensured, so the leads are precisely led into the slits 22 of the contacts 20a through 20c.

When the cover 40 is pressed down to the lowest position in the housing, the protrusions of the locking arms 45 of the cover engage with the hooks 15, which are provided in the lateral faces of the housing. As a result, the cover 40 is fixed to the housing 10, and the assembly of the optical connector 1 is complete. In this condition, the optical element 30 is held and fixed between the receptor portion 13 of the housing and the holder portion 50 of the cover, and the light-capturing/emitting surface 31 of the optical element 30 is positioned to face the aperture 14, which is provided in the front portion of the housing.

The optical connector 1 can be put together by using a jig. In this case, at first, the optical element 30 is placed in the receptor portion 13 of the housing, and the leads 33a through 33c of the optical element are placed in the openings of the lead connector portions 21 of the contacts 20a through 20c, respectively, of the housing. Then, an appropriate jig (not shown) can be used to press the leads 33a through 33c into the slits 22 of the lead connector portions 21. If such a jig is used, then there is no need to provide the elevational difference in the groove 51 of the cover 40 because the cover 40 is no longer used for the purpose of pressing the leads 33a through 33c. Therefore, in this case, the groove 51 can be formed with a uniform depth, for example, with a depth which is deeper than the front bottom 52 so that the clearance slots 52a and 52b are no longer needed.

The optical connector assembly 1 is then mounted onto a circuit board 60 by inserting the lead portions 24 of the contacts 20a through 20c into through holes 61, which are provided on the circuit board 60, and then by soldering the contacts to respective electrical pathways, which are provided on the circuit board 60.

With this optical connector 1, the optical fiber 71 is easily connected to the circuit board 60 just by inserting the ferrule 70 into the optical fiber receptacle 12 of the connector. In this condition, the end 72 of the optical fiber 71 which is held in the ferrule 70 faces the light-capturing/emitting surface 31 of the optical element 30 through the aperture 14.

Figure 4:
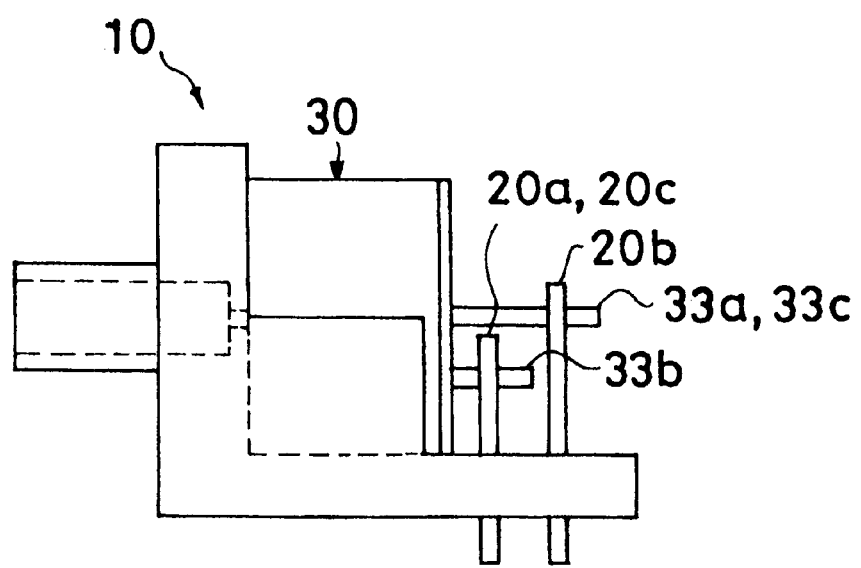
FIG. 4 is a side view that shows another optical connector, which has a different contact arrangement, being shown without the cover.
Figure 5:
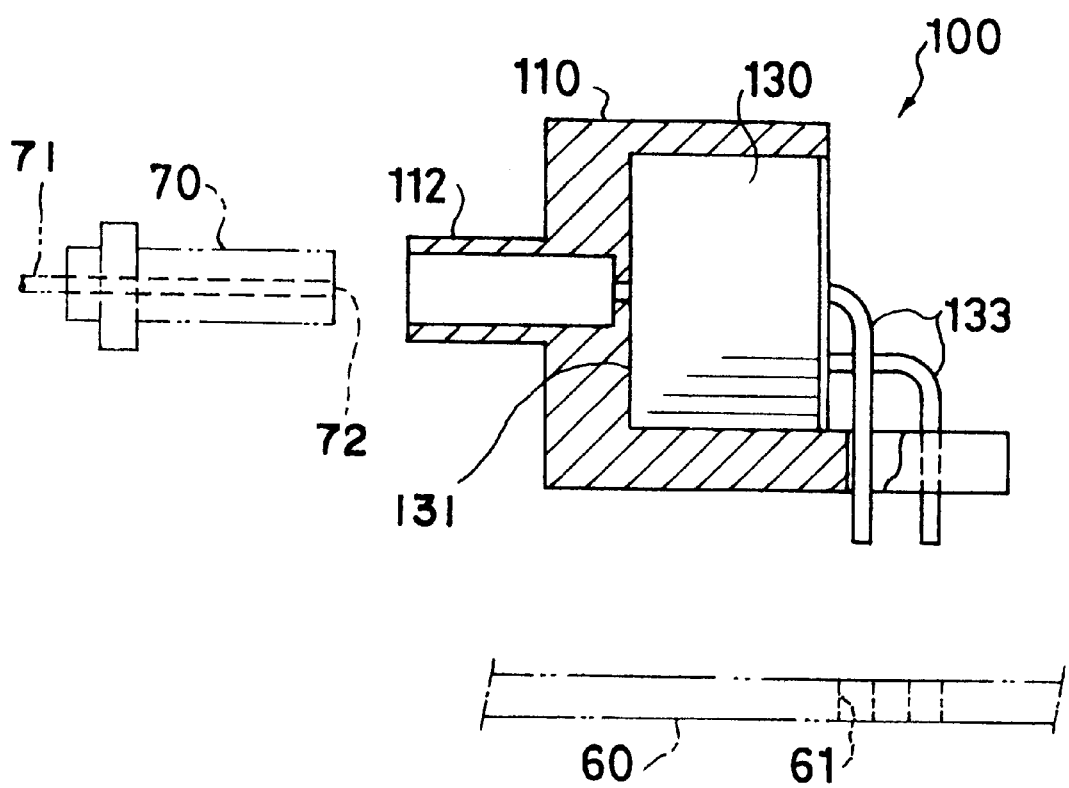
FIG. 5 is a sectional side view showing a prior art optical connector 100.

As shown in FIG. 4, the contacts 20a through 20c of the housing may be arranged in a way opposite to that described in the above. The central contact 20b may be placed in front of the lateral contacts 20a and 20c. In this case, the lateral leads 33a and 33c of the optical element are made longer than the central lead 33b, and the groove 51 is provided with, for example, a lateral elevational difference so that the leads 33a through 33c are press-fit into the respective contacts by the lowering of the cover 40.

Furthermore, all the contacts 20a through 20c may be arranged in a laterally extending row in the housing 10. In this case, the rear part of the housing which is behind the receptor portion 13 of the bottom part 11a can be formed with a relatively short length, thus making the whole axial length of the optical connector 1 shorter.

As described above, in the optical connector 1 according to the present invention, the leads 33a through 33c of the optical element are press-fit into the contacts 20a through 20c of the housing, and the lead portions 24 of the contacts 20a through 20c, which extend downward, are soldered to the respective circuit pathways provided on the circuit board. Therefore, the bending of the leads 33a through 33c are not required. For the purpose of shortening the whole length of the optical connector 1, the contacts 20a through 20c are positioned a little forward in the optical connector without causing any damage or disadvantage to the leads or to any member of the optical element.

Furthermore, as the contacts 20a through 20c are fixed in the housing 10, the orientation or the positions of the lead portions 24 of the contacts in the housing 10 are fixed. Therefore, there is no occurrence of mis-orientation of the insertion ends of the leads, which may otherwise be disorderly positioned and may not be easily inserted into the through holes 61 of the circuit board.

Moreover, as the leads 33a through 33c of the optical element are automatically press-fit into the contacts 20a through 20c of the housing when the cover 40 is mounted onto the housing, the assembly work is easily carried out.

The above description is made for an optical connector in which only one optical element is mounted. However, the present invention is not limited to this design. The optical connector of the present invention can be easily modified and be applied to a case where a plurality of optical elements are to be mounted. Also, the above example describes that, for the mounting of the optical connector, the lead portions of the contacts are inserted into through holes of a circuit board. However, the lead portions of the contacts can be designed such that the leads are placed onto respective circuit pathways to surface-mount the optical connector.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.9-207448 filed on Aug. 1, 1997, which is incorporated herein by reference.

What is claimed is:

1. An optical connector comprising:
an optical element, which is formed in a cylindrical figure, said optical element having a light-capturing/emitting surface on an axially frontal face and an element lead, which extends axially rearward from a rear face of said optical element;
a housing having a base portion and an optical fiber receptacle, said base portion including an element receptor portion formed on an upper side thereof to accommodate and retain said optical element, said optical fiber receptacle being fromed in front of said element receptor portion to accept and retain a ferule attached to an end of an optical fiber;
a contact which is made of an electrically conductive material and is provided in said housing, said contact passing vertically through said base portion in rear of said element receptor portion, said contact including at an upper end thereof a lead connector portion, to which said element lead is connected, and at a lower end thereof a contact lead portion, which is used for connection to a circuit board, etc.; and a cover which includes an element holder portion to accommodate and retain said optical element, said cover being mountable on said housing, covering said base portion;

wherein:

when said optical element, while being oriented such that said light-capturing/emitting surface faces said optical fiber receptacle and said element lead extends straight rearward, is mounted into said element receptor potion, said element lead is brought into contact with said lead connector portion of said contact;

said lead connector portion is formed in a "U" figure with a slit which opens upward; and said element lead is lowered and press-fit into said slit of the lead connector portion of said contact to mount said element lead into said element receptor portion.

2. The optical connector as set forth in claim 1, wherein:

said housing and said cover are formed of a resin which has insulation properties; and said housing and said contact are insert-molded, said contact passing vertically through said base portion of said housing.

3. The optical connector as set forth in claim 1, wherein:

a plurality of element leads extend from said rear face of said optical element;

said contacts are provided in said base portion in a quantity equal to that of said element leads; and said element leads are brought into contact with said contacts, respectively, in one-to-one correspondence.

4. The optical connector as set forth in claim 3, wherein:

said plurality of contacts are aligned in said base portion in a plurality of rows with an axial distance; and each of said element leads has a different length which corresponds to a position of a respective contact.

5. The optical connector as set forth in claim 3, wherein:

said plurality of contacts are aligned in said base portion in a lateral row; and all said element leads have a same length.

6. The optical connector as set forth in claim 1, wherein:

a clearance slot is provided in said cover at location where said lead connector portion of said contact faces said cover such that when said cover is mounted onto said housing, said lead connector portion will come into said clearance slot.

7. The optical connector as set forth in claim 6, wherein:

a groove is provided inside said cover in such a manner that when said optical element is accommodated and held in said element holder portion, said element lead meets a bottom of said groove;

said clearance slot is provided in the bottom of said groove; and when said cover, whose element holder portion accommodating said optical element, is mounted onto said housing, the bottom of said groove presses down said element lead into said slit of said lead connector portion of said contact while allowing said lead connector portion to come into said clearance slot.

8. The optical connector as set forth in claim 1, further comprising a locking mechanism which binds said cover and said housing in an assembled condition.

9. An optical connector comprising:

an optical element, which is formed in a cylindrical figure, said optical element having a light-capturing/emitting surface on an axially frontal face and an element lead, which extends axially rearward from a rear face of said optical element;

a housing having a base portion and an optical fiber receptacle, said base portion including an element receptor portion formed on an upper side thereof to accommodate and retain said optical element, said optical fiber receptacle being fromed in front of said element receptor portion to accept and retain a ferule attached to an end of an optical fiber;

a contact which is provided in said housing, said contact passing vertically through said base portion in rear of said element receptor portion, said contact including at an upper end thereof a lead connector portion, to which said element lead is connected, and at a lower end thereof a contact lead portion, which is used for connection to a circuit board, etc.; and a cover which includes an element holder portion to accommodate and retain said optical element, said cover being mountable on said housing, covering said base portion;

wherein:

when said optical element, while being oriented such that said light-capturing/emitting surface faces said optical fiber receptacle and said element lead extends straight rearward, is mounted into said element receptor potion, said element lead is brought into contact with said lead connector portion of said contact and a clearance slot is provided in said cover at a location where said lead connector portion of said contact faces said cover such that when said cover is mounted onto said housing, said lead connector portion will come into said clearance slot.

10. The optical connector as set forth in claim 9, wherein:

said contact is made of an electrically conductive material;

said lead connector portion is formed in a "U" figure with a slit which opens upward; and said element lead is lowered and press-fit into said slit of the lead connector portion of said contact.

11. The optical connector as set forth in claim 9, wherein:

said housing and said cover are formed of a resin which has insulation properties; and said housing and said contact are insert-molded, said contact passing vertically through said base portion of said housing.

12. The optical connector as set forth in claim 9, wherein:

a plurality of element leads extend from said rear face of said optical element;

said contacts are provided in said base portion in a quantity equal to that of said element leads; and said element leads are brought into contact with said contacts, respectively, in on-to-one correspondence.

13. The optical connector as set forth in claim 12, wherein:

said plurality of contacts are aligned in said base portion in a plurality of rows with an axial distance; and each of said element leads has a different length which corresponds to a position of a respective contact.

14. The optical connector as set forth in claim 12, wherein:

said plurality of contacts are aligned in said base portion in a lateral row; and all said element leads have a same length.

15. The optical connector as set forth in claim 9, wherein:

a groove is provided inside said cover in such a manner that when said optical element is accommodated and held in said element holder portion, said element lead meets a bottom of said groove;

said clearance slot is provided in the bottom of said groove;

when said cover, whose element holder portion accommodating said optical element, is mounted onto said housing, the bottom of said groove presses down said element lead into said slit of said lead connector portion of said contact while allowing said lead connector portion to come into said clearance slot.

16. The optical connector as set forth in claim 9, further comprising a locking mechanism which binds said cover and said housing in an assembled condition.

* * * * *